United States Patent [19]

Lind

[11] Patent Number: 4,822,996
[45] Date of Patent: Apr. 18, 1989

[54] ICE BIN LEVEL SENSOR WITH TIME DELAY

[75] Inventor: LeRoy Lind, Minnetonka, Minn.

[73] Assignee: King-Seeley Thermos Company, Prospect Heights, Ill.

[21] Appl. No.: 205,608

[22] Filed: Jun. 3, 1988

Related U.S. Application Data

[63] Continuation of Ser. No. 847,917, Apr. 3, 1986, abandoned.

[51] Int. Cl.⁴ .............................................. G01V 9/04
[52] U.S. Cl. .................................. 250/222.1; 62/137
[58] Field of Search ............... 62/137; 250/221, 222.1, 250/223 R; 340/583

[56] References Cited

U.S. PATENT DOCUMENTS

| | | | |
|---|---|---|---|
| 3,045,445 | 7/1962 | MacLeod | 62/137 |
| 3,246,210 | 4/1966 | Lorenz | 62/137 |
| 3,360,951 | 1/1968 | Hoenisch | 62/137 |
| 3,367,128 | 2/1968 | Hosoda | 62/137 |
| 3,525,232 | 8/1970 | Toma | 62/137 |
| 3,731,496 | 5/1973 | Frazier | 62/137 |
| 3,760,397 | 9/1973 | Taggart | 250/221 |
| 3,911,691 | 10/1975 | Kohl | 62/137 |
| 4,010,458 | 3/1977 | Köpfli | 250/221 |
| 4,055,280 | 10/1977 | Kohl et al. | |
| 4,218,613 | 8/1980 | Bletz | 250/214 A |
| 4,622,826 | 11/1986 | Tsukiyama et al. | 62/137 |
| 4,652,741 | 3/1987 | Golborne | 250/222.1 |
| 4,683,373 | 7/1987 | Tupman | 250/221 |
| 4,722,372 | 2/1988 | Hoffman et al. | 250/221 |

Primary Examiner—David C. Nelms
Assistant Examiner—Michael Messinger
Attorney, Agent, or Firm—Harness, Dickey, Pierce

[57] ABSTRACT

A circuit for controlling an automatic ice making system of a refrigeration apparatus. The device includes an electrical circuit which operates the ice making machine using a light interrupter system. A plused light source is placed such that it will be interfered when the ice has reached a predetermined level in the ice containing bin. The circuit uses operational amplifier signal processing components which activate the ice making machine once the light source is sensed for a predetermined period of time and deactivates the ice maker when the light source is not sensed for another predetermined period of time. The circuit also includes means for eliminating the effect of ambient lights.

19 Claims, 2 Drawing Sheets

ICE BIN LEVEL SENSOR WITH TIME DELAY

This is a continuation of U.S. Patent application Ser. No. 847,917, filed Apr, 3, 1986 entitled Ice Bin Level Sensor.

BACKGROUND OF THE INVENTION

This invention relates to an electrical circuit and particularly to one that functions to detect the amount of ice accumulated in the ice bin of a refrigeration apparatus having an automatic ice making function.

Many modern freezers used in industrial and residential applications include automatic ice making systems which deposit ice cubes into an ice bin for storage. A means for controlling the output of these types of ice making systems is needed to enable ice being consumed to be replenished and to prevent the mechanism from overproducing. Many existing designs for such controls employ means for weighing the ice bin or employ paddle-type sensors which detect the height of the accumulated pile of ice cubes. Although these devices generally perform satisfactorily, it is desirable to provide an improved ice bin level sensor which controls an ice making machine and operates without moving parts.

In accordance with this invention, an ice bin sensor circuit is provided which enables the detection of the quantity of ice in an ice bin using a beam of infrared light which is interrupted when the ice bin is filled to capacity. The circuit automatically controls the ice making apparatus to maintain a desired quantity of available ice cubes. Although light interrupter circuits are well known, the circuit according to this invention is efficiently designed for its intended function and employs readily available and inexpensive components. In order to prevent improper operation due to transient interruptions of the light beam, the circuit includes a time delay function. The circuit further includes means for preventing improper operation caused by ambient light, and includes a mechanism for rapid testing of the circuit during production or in-the-field malfunction diagnosis.

Additional benefits and advantages of the present invention will become apparent to those skilled in the art to which this invention relates from the subsequent description of the preferred embodiment and the appended claims, taken in conjunction with the accompanying drawings.

BRIEF DESCRIPTION OF THE DRAWINGS

FIG. 3 is a detailed schematic drawing of the circuit according to this invention.

DETAILED DESCRIPTION OF THE INVENTION

Figure 1:
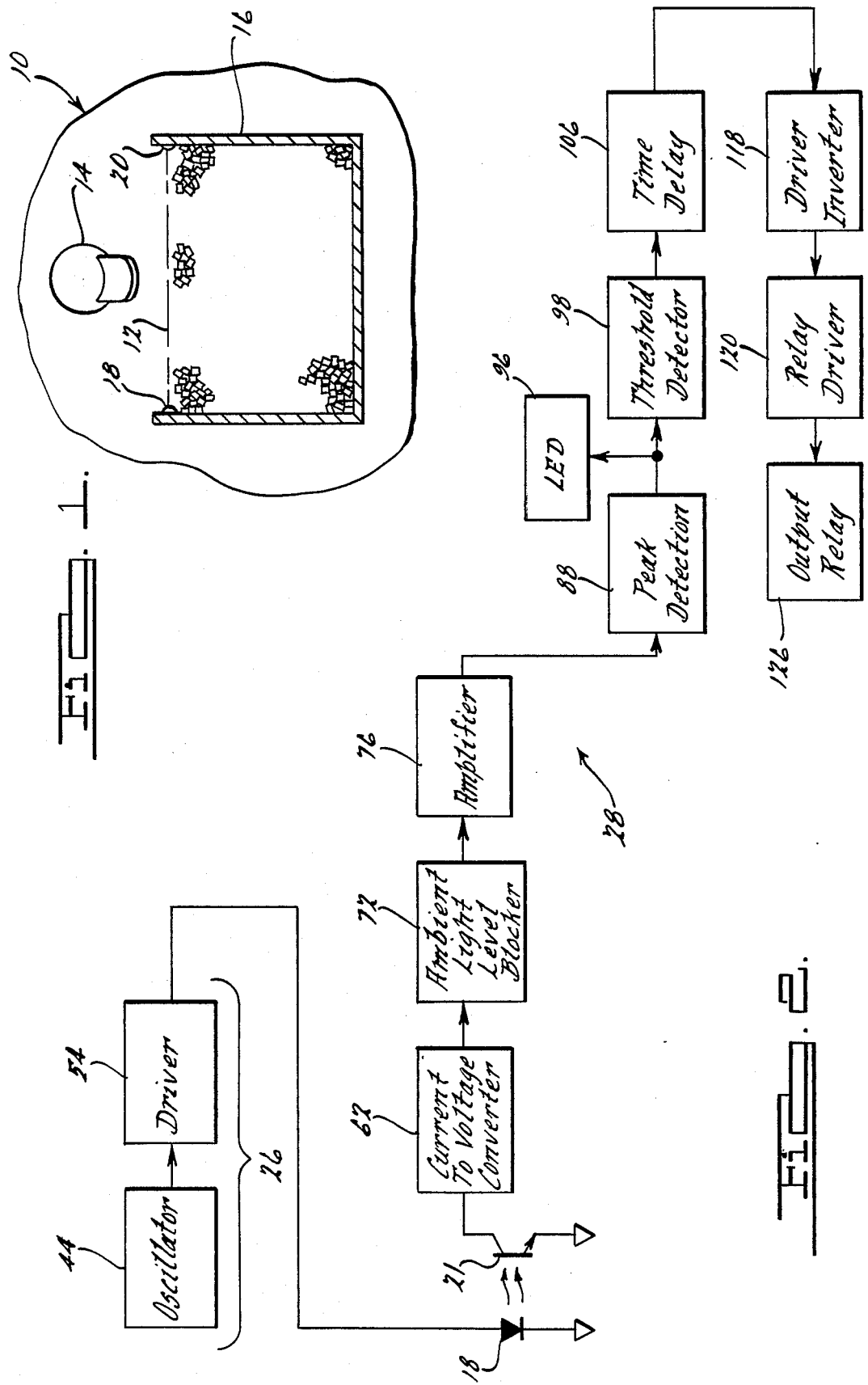
FIG. 1 is a pictorial view showing a representative automatic ice making device.

With particular reference to FIG. 1, refrigeration apparatus 10 is shown which includes an automatic ice maker device having a discharge port 14. In order for refrigeration apparatus 10 to operate automatically, it is necessary to provide some means for controlling the output of the ice making device such that it will provide ice when desired, but will not overfill ice bin 16. In accordance with this invention, such control is provided by an infrared (IR) transmitter 18 and an infrared sensitive photo detector 20 which are mounted to opposing walls within ice bin 16. When the accumulated pile of ice cubes is below the line of sight 12 between transmitter 18 and photo detector 20, the ice device is actuated to produce ice cubes. This action proceeds until the infrared light beam is interrupted, at which time the ice making function is caused to cease. Transmitter 18 and photo detector 20 are controlled by ice bin sensor circuit 22. The components making up ice bin sensor circuit 22 are described in detail below.

Figure 2:
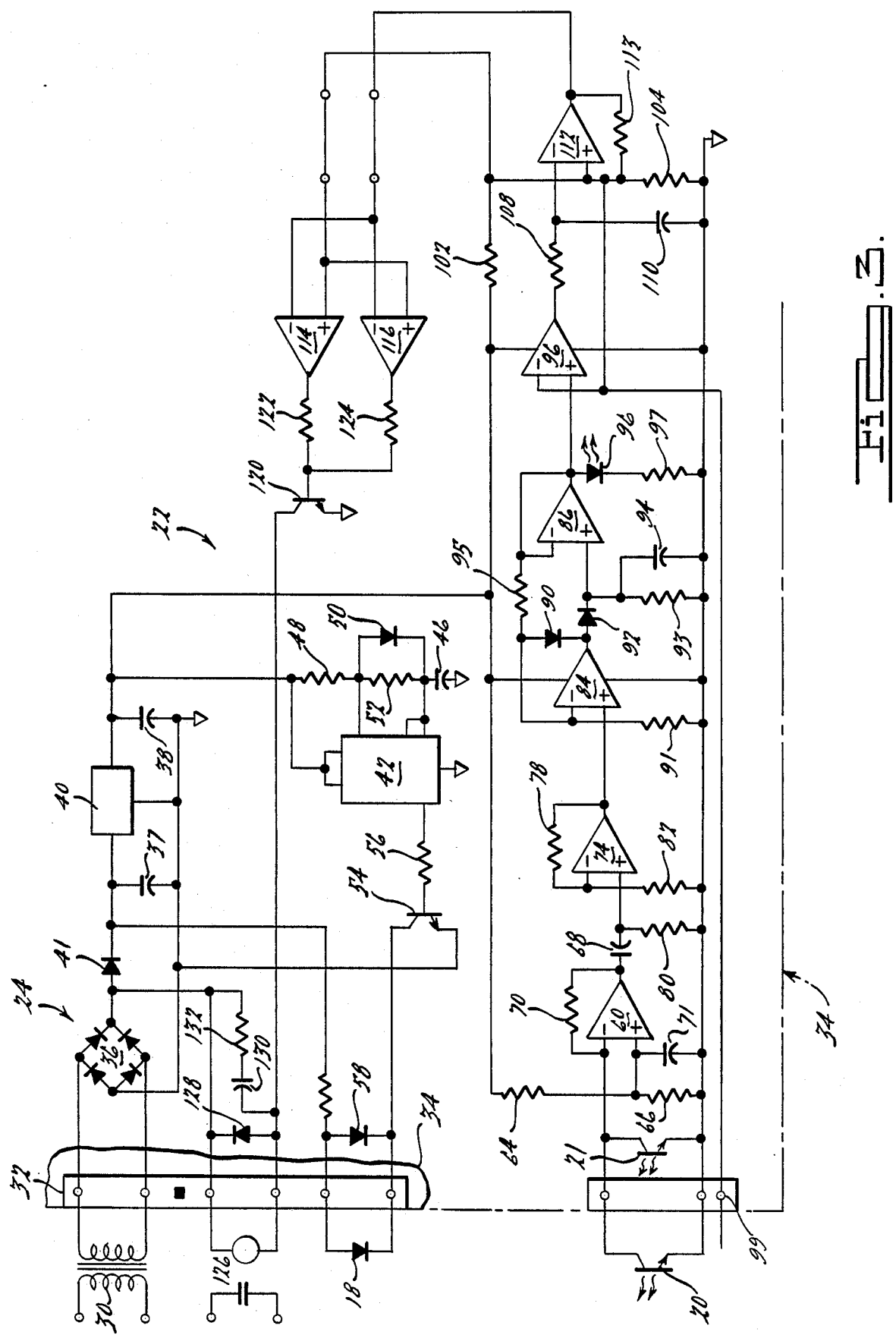
FIG. 2 is a block diagram of the various functional subparts of the circuit according to this invention.

FIG. 2 is a block diagram of the various functional subparts of circuit 22, whereas FIG. 3 is a detailed schematic diagram of the circuit showing each of the individual components. Ice bin sensor circuit 22 is comprised of three primary circuits: power supply 24, IR transmitter driver circuit 26, and detector circuit 28, each of which are preferably mounted to a single PC board 34.

As shown in FIG. 3, power supply 24 includes step-down power transformer 30 which is connected to several pins on terminal strip 32 mounted to PC board 34. Power from step-down transformer 30 is conducted to full wave bridge rectifier 36 where it is converted to a DC voltage having an average value of sligthly greater than 12 volts. Filter capacitors 37 and 38 are used to decrease the ripple of the rectified signal. Additional filtering and voltage control is provided through use of IC voltage regulator 40. Diode 41 is provided to inhibit negative going spikes which may be generated by circuits connected to power supply 24.

IR driver circuit 26 employs a well-known "555" timer 42 which, together with additional components, is used in circuit 26 as an oscillator 44 which operates driver transistor 54. Timer 42 functions by monitoring the level of charge of external timing capacitor 46. The output of timer 42 is high when capacitor 46 is charging which occurs by current flow through resistor 48. Diode 50 is provided such that the charging of capacitor 46 occurs only through resistor 48 by bypassing resistor 52. Once capacitor 46 reaches approximately two-thirds the voltage of the supply, the output of timer 42 becomes low, and the timer switches to a capacitor discharging mode. Discharging of capacitor 46 occurs through resistor 52. The use of diode 50 causes capacitor 46 to charge very rapidly and discharge much more slowly. This operation of timer 42 generates a rectangular pulsed output having a very low percentage duty cycle, i.e. narrow positive voltage spikes are separated by relatively long dwell periods. The output of timer 42 controls the base current of driver transistor 54 through resistor 56. The rectangular pulsed output which drives the base of driver transistor 54 switches a twelve volt signal from power supply 24 to cause current to flow through IR transmitter 18 which is preferably a light emitting diode (LED) and is connected to several pins of terminal strip 32. LED 58 is also provided as an auxiliary IR transmitter which is mounted on PC board 34 which may be used for future applications but is not employed in connection with the present invention.

Detector circuit 28 is comprised of a number of integrated operational amplifiers (multipurpose analog amplifiers) such as the National Semiconductor Model LM 324 having four individual operational amplifiers (op amps) packaged together. Photo detector 21 provides a variable resistance dependent on its exposure to light within its sensitive range. Auxiliary photo detector 20 may be provided for future applications. Photo detector 21 provides a variable current signal which is applied to the inverting (minus) terminal of op amp 60 which functions as a current-to-voltage convertor 62. The non-inverting (plus) terminal of op amp 60 is provided with a constant voltage biasing source of approximately eight volts which is set by the voltage division provided by resistors 64 and 66. Variations in current through photo detector 21 caused by exposure to the pulsating light from IR transmitter 18 results in op amp 60 providing a positive going only alternating voltage output signal. Feedback resistor 70 provides gain control for op amp 60. Capacitor 68 acts an an ambient light level blocker 72 for removing DC components from the output of op amp 60 which could result, for example, due to constant or low frequency ambient light inputs to photo detector 21. Capacitor 71 and resistor 80 are provided for additional signal conditioning.

Op amp 74 is used as an amplifier 76 of the signal from capacitor 68, boosting it to a desired level using feedback resistor 78. Resistors 78 and 82 adjust the input levels of op amp 74 to desired magnitudes. Op amps 84 and 86 are configured to provide a peak detector circuit 88 by employing diodes 90 and 92, capacitor 94 and resistors 91, 93 and 95. The output of peak detector circuit 88 is a DC level with some sawtooth rippling interposed on it due to charging of capacitor 94. The output of the peak detector circuit 88 from op amp 86 is positive when an alternating signal is received by photo detector 21. When this condition occurs, voltage is supplied to LED 96 and through resistor 97 which is mounted to PC board 34 to provide an indication that ice bin 16 is not filled.

Op amp 96 is employed as a threshold detector 98 by comparing the signal provided by op amp 86 with a reference voltage provided by a voltage divider defined by resistors 102 and 104. Op amp 96 provides a positive output once the difference between the signals supplied by op amp 86 and the reference signal becomes positive. A time delay circuit 106 is defined by resistor 108, capacitor 110 and op amp 112. The values of resistor 108 and capacitor 110 are chosen such that the voltage signal applied to the minus terminal of op amp 112 changes slowly. When the output of op amp 96 goes positive, time delay circuit 106 causes the input signal to op amp 112 to remain below the reference voltage for a predetermined period of time, for example, about 10 seconds. Similarly, when the output of op amp 96 goes negative, the input signal to op amp 112 remains above the reference voltage for a predetermined time period. When the signal applied to the minus terminal of op amp 96 exceeds the reference voltage, a negative output is provided by op amp 112. Resistor 113 is provided for gain control of op amp 112. Terminal 99 is provided which is connected to the minus input of op amp 96 and enables a test signal to be applied to check the operation of circuit 22.

The signal from the output of op amp 112 is transmitted to a pair of op amps 114 and 116 which comprise a driver-inverter 118. The signal from op amp 112 is divided and applied to both negative inputs of op amps 114 and 116 which compare this signal with the reference signal applied across resistor 104. Op amps 114 and 116 drive delay driver transistor 120 through resistor 122 and 124. Transistor 120 controls current flow to relay 126 which operates the ice making apparatus used with this invention. Diode 128, capacitor 130 and resistor 132 are provided to dampen electrical noise generated by operation of the high inductance relay 126.

Ice bin sensor circuit 22, as described above, automatically operates an ice making device by continually monitoring the level of retained ice and periodically activating and deactivating the ice maker to maintain a desired ice supply level. When light from IR transmitter 18 strikes photo detector 21 for a time exceeding the time delay, the ice maker is activated to produce ice. The time delay function prevents inadvertent operation of the ice making device in response to transient exposure of photo detector 21 to light which may occur when ice is being removed from ice bin 16. When the ice bin becomes filled, light from IR transmitter 18 is interrupted. If the light beam interruption exists for a period of time exceeding the time delay, the ice maker is deactivated. The time delay in deactivating the ice maker is desirable to avoid response to transient conditions, and also to allow a small degree of overfilling of the ice bin to reduce cycling of the system.

While the above description constitutes the preferred embodiments of the present invention, it will be appreciated that the invention is susceptible to modifications, variation and change without departing from the proper scope and fair meaning of the accompanying claims.

What is claimed is:

1. An electrical circuit for use in a refrigeration device having an ice making device, an ice bin for receiving ice produced by said ice making device, said electrical circuit controlling said ice making device to cause said device to provide ice when the accumulated ice in said bin is below a predetermined level said circuit comprising:

a light source, a light sensitive element spaced from said light source such that when said ice is above said predetermined level, the light path between said light source and said light sensitive element is interrupted, said light sensitive element producing a current proportional to the level of light it receives, current-to-voltage convertor means which receives a current signal from said light sensitive element and converts said signal to a voltage signal, peak detector means comprising at least one first operational amplifier having at least one diode providing feedback to said operational amplifier for detecting the peaks of said voltage signal from said current-to-voltage means, threshold detector means comprising at least one second operational amplifier for passing the signal from said peak detector means only if said signal exceeds a predetermined threshold, and time delay means which provides an output which controls said ice making device only after the signal from said threshold detector means exists for at least a first predetermined time duration, such that when said ice is below said predetermined level for said first predetermined time duration, said time delay means activates said ice making device, said time delay means further maintaining said output until said signal from said threshold detector does not exist for a second predetermined time duration, such that when said ice is above said predetermined level for said second predetermined time period, said time delay means deactivates said ice making device, said time delay means comprising at least one third operational amplififier having an input and at least one resistor and capacitor circuit connected to the input of said third operational amplifier, said resistor and capacitor circuit also being connected to said threshold detector and defining a time constant which in turn defines both said first and said second predetermined time durations, wherein said time constant is selected such that the discharge of ice from said ice making device does not deactivate said ice making device if the level in said bin is below said predetermined level, and wherein said time constant is further selected such that the momentary displacement of ice in said bin during vending will not activate said ice making device.

2. The electrical circuit according to claim 1 further comprising an oscillator for driving said light source to produce a pulsed light output and direct current blocking means for receiving said voltage signal from said current-to-voltage convertor means and passes only alternating voltage components, thereby functioning as an ambient light level blocker.

3. The electrical circuit according to claim 1 wherein said light source generates infrared frequency light.

4. The electrical circuit according to claim 1 wherein said current-to-voltage convertor means comprises a first operational amplifier.

5. The electrical circuit according to claim 2 wherein said direct current blocking means comprises a capacitor.

6. The electrical circuit according to claim 2 further comprising an amplifier which amplifies the signal from said direct current blocking means and provides an amplified signal to said peak detector means.

7. The electrical circuit according to claim 6 wherein said amplifier is a second operational amplifier.

8. The electrical circuit according to claim 1 further comprising a visible light emitting means which is energized by the signal from said peak detector means, thereby providing an indication that said light sensitive element is receiving a signal from said light source.

9. The electrical circuit according to claim 1 wherein said time delay means comprises a resistor-capacitor network.

10. The electrical circuit according to claim 1 further comprising a driver inverter which receives a signal from said time delay means and drives a driver transistor which controls said ice maker.

11. The electrical circuit according to claim 10 wherein said driver transistor provides a signal to a relay controlling said ice maker.

12. The electrical circuit according to claim 1 wherein said peak detector comprises a third and a fourth operational amplifier.

13. The electrical circuit according to claim 1 wherein said threshold detector comprises a fifth operational amplifier.

14. The electrical circuit according to claim 9 wherein said time delay means further comprises a sixth operational amplifier.

15. The electrical circuit according to claim 10 wherein said driver-inverter comprises a seventh and an eighth operational amplifier.

16. The electrical circuit according to claim 1 wherein said first and second determined time durations are approximately equal.

17. An electrical circuit for use in a refrigeration device having an ice making device, an ice bin for receiving ice produced by said ice making device, said electrical circuit controlling said ice making device to cause said device to produce ice when the accumulated ice in said bin is below a predetermined level, said circuit comprising:

a light emitting diode light source which produces light of infrared frequencies, a first driver transistor controlling current flow to said light source, an oscillator driving said first driver transistor to control said first driver transistor to produce a pulsed light output, a photo detector spaced from said light source such that when said ice is above said predetermined level, the light path between said light source and said photo detector is interrupted, said photo detector producing a current proportional to the level of light it receives, a first operational amplifier operating as a current-to-voltage convertor which receives a current signal from said photo detector and converts said signal to a voltage signal, a capacitor coupled to the output of said first operational amplifier thereby passing only alternating voltage signal components and functioning as an ambient light level blocker, a second operational amplifier for amplifying the signal from said capacitor, third and fourth operational amplifiers coupled to a pair of diodes functioning as a peak detector for detecting the peaks of said signal from said second operational amplifier.

a fifth operational amplifier coupled to said fourth operational amplifier and functioning as a threshold detector for passing the signal from said fourth operational amplifier only if said signal exceeds a predetermined threshold, a time delay means including a resistor capacitor network and a sixth operational amplifier which provides an output after the signal from said fifth operational amplifier exists for at least a first predetermined time duration, and continues to provide said output until said signal from said fifth operational amplifier is interrupted for at least a second predetermined time duration, a driver including a seventh operational amplifier which receives a signal from said sixth operational amplifier, a relay driver transistor controlled by said seventh operational amplifier, and a relay coupled to said relay driver transistor whereby when said ice is below said predetermined level for said first predetermined time duration, said relay driver transistor actuates said relay and said ice making apparatus to produce ice and when said ice is above said predetermined level for said second predetermined time duration, said relay driver transistor deactivates said relay and said ice making apparatus.

18. The electrical circuit according to claim 17 further comprising an eighth operational amplifier connected in parallel with said seventh operational amplifier and operating with said seventh operational amplifier to control said second driver transistor.

19. The electrical circuit according to claim 17 wherein said first and second predetermined time durations are approximately equal.

* * * * *

UNITED STATES PATENT AND TRADEMARK OFFICE
CERTIFICATE OF CORRECTION

PATENT NO. : 4,822,996

DATED : April 18, 1989

INVENTOR(S) : LeRoy Lind

It is certified that error appears in the above-identified patent and that said Letters Patent is hereby corrected as shown below:

Abstract, Line 1, insert: "In accordance with this invention," at beginning of first paragraph;

Abstract, Line 1, "A" should be --a--;

Abstract, Line 2, insert "is disclosed" between --apparatus-- and --.--;

Abstract, Line 4, "plused" should be --pulsed--;

Col. 3, Line 11, "an" should be --as-- (first occurrence);

Col. 3, Line 12, "for" should be --by--;

Col. 3, Line 20, "of" should be --to--;

Col. 3, Line 63, "delay" should be --relay--;

UNITED STATES PATENT AND TRADEMARK OFFICE
CERTIFICATE OF CORRECTION

PATENT NO. : 4,822,996
DATED : April 18, 1989
INVENTOR(S) : LeRoy Lind

It is certified that error appears in the above-identified patent and that said Letters Patent is hereby corrected as shown below:

Col. 3, Line 63, "resistor" should be --resistors--;

Col. 4, Line 29, Claim 1, "provide" should be --produce--;

Col. 4, Line 66, Claim 1, "amplififier" should be --amplifier--.

Signed and Sealed this

Nineteenth Day of March, 1991

*Attest:*

HARRY F. MANBECK, JR.

*Attesting Officer*   *Commissioner of Patents and Trademarks*